J. M. EBY.
Shovel-Plow.

No. 63,711.

Patented Apr. 9, 1867.

Witnesses.

Inventor.

United States Patent Office.

JACOB M. EBY, OF WARREN, ILLINOIS.

Letters Patent No. 63,711, dated April 9, 1867.

---

IMPROVEMENT IN DOUBLE-SHOVEL PLOUGH.

---

*The Schedule referred to in these Letters Patent and making part of the same.*

---

TO ALL WHOM IT MAY CONCERN:

Be it known that I, JACOB M. EBY, of Warren, in the county of Jo Daviess, and State of Illinois, have invented a new and improved Double-Shovel Plough; and I do hereby declare that the following is a full, clear, and exact description thereof, which will enable those skilled in the art to make and use the same, reference being had to the accompanying drawings, forming part of this specification, in which—

Similar letters of reference indicate corresponding parts.

My invention has for its object to furnish an improved double-shovel plough simple in construction, durable and cheap, and which will not be liable to weather-beat, sun-crack, or break; and it consists in an iron double-shovel plough formed by the combination of the handles, beams, standards, and braces with each other, when said parts are made and arranged in the manner hereinafter described, and in making the uprights or standard in the shape shown and described.

Figure 1:
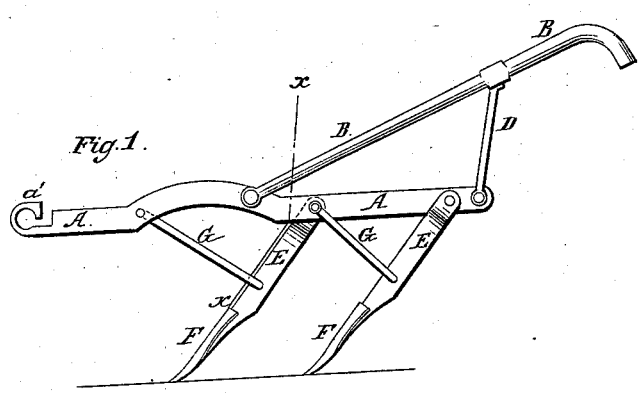
Figure 1 is a side view of my improved double-shovel plough.
Figure 2:
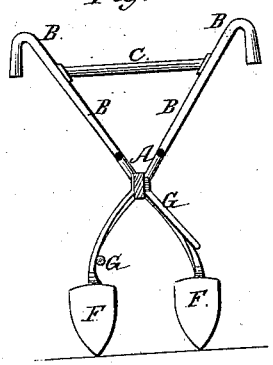
Figure 2 is a front view of the same partly in section through the line $x\ x$, fig. 1.

A is the beam, which is made of iron and in substantially the shape shown in fig. 1. Upon the forward end of the beam A is formed a hook, $a'$, to which the horse is attached. B are the iron handles, the forward ends of which are secured to the beam A by a bolt and nut or rivet at about the middle point of said beam. The upper part of the handles B are connected together and held in their proper relative positions by the iron rod C, as shown in fig. 2, and they are connected to the rear end of the beam A by the iron braces D, as shown in fig. 1. E are the uprights or standards to which the shovels F are attached, and which are made curved in substantially the form shown in figs. 1 and 2, so as to bring the shovels F into a proper working position. The upper ends of the uprights E are secured to the beam A by bolts or rivets, and they are further strengthened by iron braces G, the rear ends of which are secured to the said uprights or standards, and their forward ends to the beam A, as shown in fig. 1. F are the shovels, which are attached to the lower ends of the standards E by bolts or rivets. The shovels F are made of cast steel, and all other parts of the plough of iron. The various parts of the plough are represented in the drawings as being secured to each other by rivets, but I prefer to secure them by bolts and nuts so that the plough can be taken apart, if necessary, without difficulty. The plough when made as herein described is of about the same weight as the common wooden double-shovel plough, and much more durable, as it is not liable to weather-beat or sun-crack, and is not so liable to be broken.

I claim as new, and desire to secure by Letters Patent—

1. An improved iron double-shovel plough formed by the combination of the beam A, handles B, standards or supports E, and braces D and G with each other, when said parts are formed and arranged substantially as herein shown and described.

2. Making the uprights or standards E substantially in the shape herein shown and described and for the purpose set forth.

JACOB M. EBY.

Witnesses:
JAMES BAYNE,
WILLIAM H. SHILL.